(12) United States Patent
Ebiko (10) Patent No.: US 8,281,830 B2
(45) Date of Patent: Oct. 9, 2012

(54) PNEUMATIC TIRE WITH TREAD PATTERN INCLUDING LAND PORTIONS HAVING RIB-LIKE CONFIGURATIONS

(75) Inventor: Masahiro Ebiko, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 669 days.

(21) Appl. No.: 12/420,565

(22) Filed: Apr. 8, 2009

(65) Prior Publication Data
US 2009/0255614 A1 Oct. 15, 2009

(30) Foreign Application Priority Data
Apr. 11, 2008 (JP) .................. 2008-103491

(51) Int. Cl.
B60C 11/04 (2006.01)
B60C 11/12 (2006.01)
B60C 11/13 (2006.01)

(52) U.S. Cl. ............ 152/209.2; 152/900; 152/901; 152/DIG. 3

(58) Field of Classification Search ........... 152/209.2, 152/209.15, 209.18, 209.21, 209.28, DIG. 3, 152/900, 901, 902, 903
See application file for complete search history.

(56) References Cited

U.S. PATENT DOCUMENTS

| | | |
|---|---|---|
| 3,115,919 A | 12/1963 | Roberts |
| 6,079,464 A * | 6/2000 | Hatakenaka et al. ......... 152/902 |
| 2001/0032691 A1* | 10/2001 | Ohsawa .................. 152/209.18 |
| 2003/0094227 A1 | 5/2003 | Bettiol et al. |
| 2005/0167022 A1* | 8/2005 | Hashimoto .......... 152/DIG. 003 |
| 2006/0042738 A1 | 3/2006 | Matsumoto |
| 2007/0240801 A1* | 10/2007 | Tanaka ................. 152/209.21 |

FOREIGN PATENT DOCUMENTS

| | | |
|---|---|---|
| CA | 2083627 A * | 9/1999 |
| DE | 3943014 A1 * | 6/1990 |
| EP | 0 295 195 A1 | 12/1988 |
| EP | 0 369 932 | 5/1990 |
| GB | 460338 A * | 1/1937 |
| GB | 1 451 812 | 10/1976 |
| JP | 2-175302 | 7/1990 |
| JP | 06-055913 A * | 3/1994 |
| JP | 06-183214 A * | 7/1994 |
| JP | 07-186633 | 7/1995 |
| JP | B2 2710341 | 2/1998 |
| JP | 11-342708 | 12/1999 |
| JP | 2003-182315 A * | 7/2003 |
| JP | 2006-224770 | 8/2006 |
| JP | 2007-015655 | 1/2007 |
| JP | 2008-189240 | 8/2008 |

OTHER PUBLICATIONS machine translation for Germany DE 3,943,014 (no date).*
machine translation for Japan 06-055913 (no date).*
machine translation for Japan 2003-182315 (no date).*
machine translation for Japan 06-183214 (no date).*

* cited by examiner

Primary Examiner — Steven D Maki
(74) Attorney, Agent, or Firm — Greer, Burns & Crain, Ltd.

(57) ABSTRACT

A pneumatic tire has a tread pattern which comprises at least three circumferential grooves with a groove width of 6 to 18 mm and a groove depth of 6.0 to 16.0 mm extending in a tire circumferential direction, wherein, on groove walls on both sides forming the at least three circumferential grooves, first inclined walls inclined by an inclination angle of 5 to 20 degrees with respect to the tire circumferential direction and second inclined walls inclined by an inclination angle of 0 to 45 degrees with respect to a tire width direction are provided so as to be successively connected in the tire circumferential direction so that positions of groove ends in the tire width direction vary in the tire circumferential direction.

7 Claims, 4 Drawing Sheets

PATTERN b

FIG. 5

PATTERN c

FIG.6

PATTERN d

PNEUMATIC TIRE WITH TREAD PATTERN INCLUDING LAND PORTIONS HAVING RIB-LIKE CONFIGURATIONS

The entire contents of literature cited in this specification are incorporated herein by reference.

BACKGROUND OF THE INVENTION

The present invention relates to a pneumatic tire having a tread pattern including at least three circumferential grooves extending in a tire circumferential direction.

It is known that, in a tire, a tire noise reduction performance and a traction performance (on-snow performance) on a snow-covered road are antinomic performances.

In order to achieve a reduction in tire noise, it is common practice to reduce a tire groove area, in particular, a groove area of lug grooves extending from tire circumferential main grooves and inclined in a width direction with respect to the circumferential tire main grooves. However, in order to achieve an improvement in on-snow performance, it is common practice to increase the groove area of the lug grooves, with the result that a reduction in tire noise and an improvement in on-snow performance have been regarded as being mutually incompatible. In particular, regarding a tire for a sport utility vehicle (SUV) and an all-season tire provided for comfortable traveling on muddy roads and snow-covered roads and for comfortable traveling on dry roads, there is a demand for compatibility between the reduction in tire noise and securing of the requisite on-snow performance.

In this context, JP 2710341 B discloses a pneumatic tire in which tire blocks are arranged alternately with respect to circumferentially adjacent blocks.

More specifically, JP 2710341 B discloses a tire in which, as illustrated in FIG. 2 of JP 2710341 B, blocks 32X and blocks 32Y adjacent thereto are offset with respect to each other in the tire width direction.

However, in the above-mentioned pneumatic tire, it is not always possible to attain such reduction in tire noise and such an improvement in on-snow performance as described above.

In view of the above-mentioned problem in the prior art, it is an object of the present invention to provide a pneumatic tire capable of attaining both a reduction in tire noise and an improvement in on-snow performance and, in particular, a pneumatic tire having a feature in terms of a pattern.

A pneumatic tire according to the present invention has a tread pattern which comprises at least three circumferential grooves with a groove width of 6 to 18 mm and a groove depth of 6.0 to 16.0 mm extending in a tire circumferential direction, wherein, on groove walls on both sides forming the at least three circumferential grooves, first inclined walls inclined by an inclination angle of 5 to 20 degrees with respect to the tire circumferential direction and second inclined walls inclined by an inclination angle of 0 to 45 degrees with respect to a tire width direction are provided so as to be successively connected in the tire circumferential direction so that positions of groove ends in the tire width direction vary in the tire circumferential direction, connecting portions between the first inclined walls and the second inclined walls being bent in a V-shape in a plan view of the tread pattern, a length of the first inclined walls being larger than a length of the second inclined walls, every two of the first inclined walls on both sides of each of the second inclined wall having a step amount of 1.5 to 5.0 mm in the tire width direction, three to five pairs of the first inclined walls and the second inclined walls adjacent to each other being provided for one tread pattern.

DETAILED DESCRIPTION OF THE PREFERRED EMBODIMENT

In the following, a preferred embodiment of a pneumatic tire of the present invention is described in detail with reference to the accompanying drawings.

A pneumatic tire (hereinafter, simply referred to as tire) according to an embodiment of the present invention is an SUV tire. The dimension example employed in the following description is mainly that for a 265/70R17 tire, and it is a dimension example that can be effectively employed for a tire with a nominal tire width of 175 to 305.

Figure 1A:
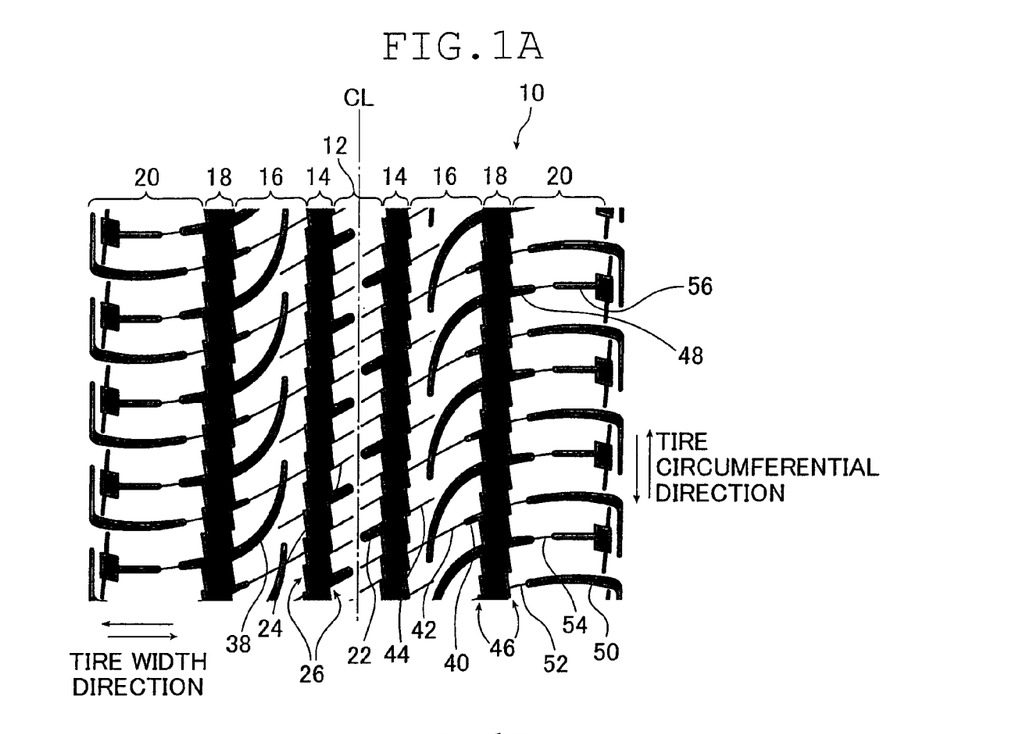
FIG. 1A is a developed view of a tread pattern of a tire according to the present invention.

As illustrated in FIG. 1A, the tire of the present invention has in a tread portion thereof a tread pattern 10 constituting a feature of the present invention. FIG. 1A is an easy-to-see developed view of the tread pattern 10 of the tire of the present invention.

In the present invention, there are not particular limitations regarding a tire structure and a rubber member of the present invention. The tire structure and rubber member may be well-known ones or novel ones.

As illustrated in FIG. 1A, the tread pattern 10 is of a non-line-symmetrical configuration with respect to a tire center CL passing a tire equatorial plane, and it is of a point-symmetrical configuration. In the present invention, it is not always necessary for the tread pattern to be of the point-symmetrical configuration.

In the present invention, the term "tire width direction" refers to a direction of a tire rotation center axis, and the term "tire circumferential direction" refers to a rotating direction of a rotating plane of a tread surface formed by rotating the tire around the tire rotation center axis. Those directions are illustrated in FIG. 1A.

Further, in the present invention, a lug groove is a groove whose groove width is 2 mm or more and whose groove length is 5 mm or more. On the other hand, in the present invention, a sipe is a groove whose width is 1.2 mm or less.

Further, in the present invention, the term "tread width" refers to a maximum tread width in the tire width direction as obtained when the tire is caused to tread on a horizontal surface under an inner pressure condition of 200 kPa and under a load condition which is 85% of the load capacity under a pressure of 200 kPa as specified in JATMA, TRA, or ETRTO.

Further, in the present invention, a circumferential groove, which extends in the tire circumferential direction, is a groove whose groove width ranges from 6 to 18 mm and whose groove depth ranges from 6.0 to 16.0 mm.

The tread pattern 10 mainly includes a first land portion 12 which extends in the tire circumferential direction and through which the tire center CL passes, first main grooves 14 adjacent to both sides of the first land portion 12 and extending in a communicating manner in the tire circumferential direction, second land portions 16 provided adjacent to outer sides in the tire width direction of the first main grooves 14 and extending in the tire circumferential direction, second main grooves 18 provided adjacent to the outer sides in the tire width direction of the second land portions 16 and extending in a communicating manner in the tire circumferential direction, and third land portions 20 provided on the outer sides in the tire width direction of the second main grooves 18 and extending in the tire circumferential direction.

The first land portion 12 has a rib-like configuration extending continuously in the tire circumferential direction and is provided with lug grooves 22 formed at fixed intervals extending from the first main grooves 18 toward the first land portions 12. The lug grooves 22 are closed halfway through without extending across the center line CL. The lug grooves 22 are inclined, for example, by 20 to 40 degrees with respect to the tire width direction.

Further, the first land portion 12 has two sipes 24 in every interval between circumferentially adjacent lug grooves 12. Further, the ends of the first land portion 12 in contact with the first main grooves 14 are formed as zigzag-shaped steps by point heights 26 described below. At the portions recessed due to the zigzag-shaped steps, the sipes 24 are provided at the same inclination angle as the lug grooves 22.

The first main grooves 14 are provided so as to be within a range of 15% of the tire tread width from the tire center CL. Here, providing the first main grooves 14 so as to be within a range of 15% of the tire tread width means that the center positions in the groove width direction of the first main grooves 14 are situated within the range of 15% of the tire tread width. Hereinafter, when it is stated that the positions of the main grooves are specified in terms of tread width, it means that the center positions in the groove width direction of the main grooves are specified.

The first main grooves 14 correspond to circumferential grooves and the first circumferential grooves of the present invention. The point heights 26 are provided on both side walls forming the first main grooves 14.

Figure 1B:
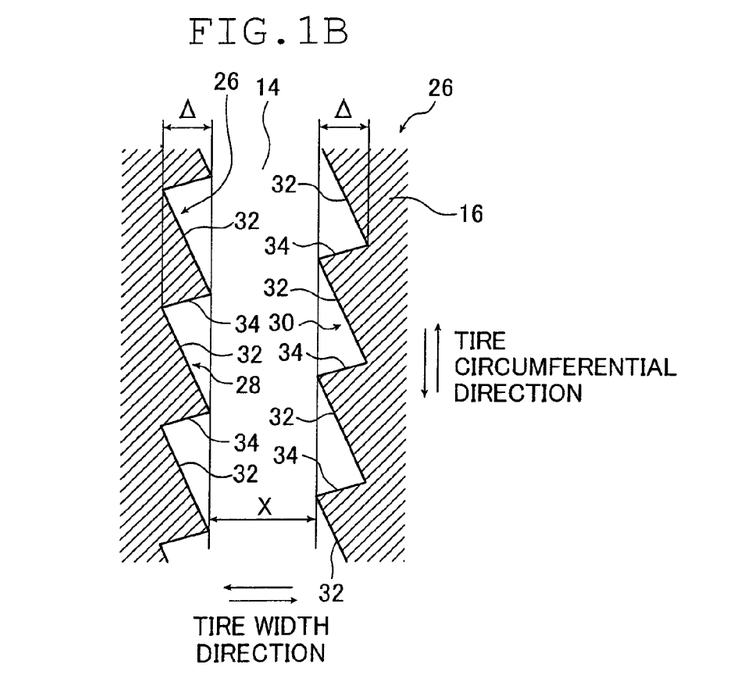
FIG. 1B is a diagram illustrating a configuration of one of first main grooves illustrated in FIG. 1A.

FIG. 1B is a schematic explanatory view of the point heights 26. In FIG. 1B, the sipes 24 are omitted from illustrated.

The point heights 26 are formed on both side groove walls 28 and 30 forming each first main groove 14 such that first inclined walls 32 and second inclined walls 34 are continuously connected in the tire circumferential direction.

The first inclined walls 32 are inclined at an inclination angle of 5 to 20 degrees with respect to the tire circumferential direction so that the positions in the tire width direction of the groove ends (edges) may vary in the tire circumferential direction. The second inclined walls 34 are inclined at an inclination angle of 0 to 45 degrees with respect to the tire width direction. In the example of FIG. 1B, the first inclined walls 32 are inclined to the left with respect to the tire circumferential direction, and the second inclined walls 34 are inclined upwardly to the right with respect to the tire width direction.

In plan view of the tire tread pattern surface, that is, as illustrated in FIGS. 1A and 1B, the connecting portions between the first inclined walls 32 and the second inclined walls 34 are bent in a V-shape. The length of the first inclined walls 32 is larger than the length of the second inclined walls 34, and a step amount Δ in the tire width direction between two first inclined walls 32 on both sides of one second inclined wall 34 is 1.5 to 5.0 mm. From the viewpoint of achieving an improvement in terms of on-snow performance, it is desirable for the ratio of the length of the first inclined walls 32 to that of the second inclined walls 34 to range from 4 to 10.

There are provided three such pairs of adjacent first and second inclined walls 32 and 34 in one tread pattern pitch determined by adjacent lug grooves 22. In the present invention, the number of pairs is not restricted to three, and it is possible to provide such pairs up to five.

The point heights 26 prove effective in achieving compatibility between a reduction in tire noise and securing of the requisite on-snow performance. When the number of the above-mentioned pairs exceeds five, the above-mentioned step amount Δ is rather insufficient, and hence an improvement in on-snow performance is not achieved.

Figure 2:
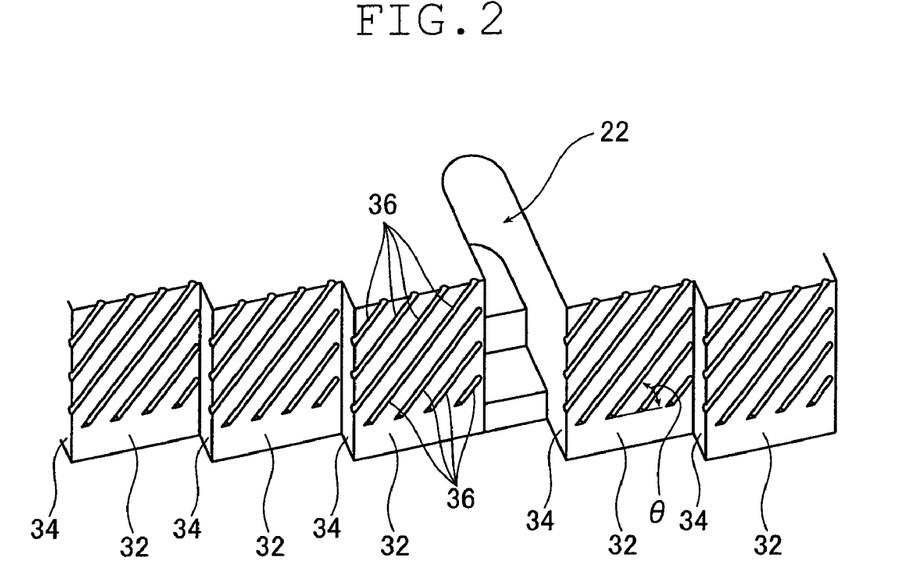
FIG. 2 is an enlarged perspective view of groove walls illustrated in FIG. 1B.

Further, as illustrated in FIG. 2, in the first inclined walls 32, there are provided minute groove groups 36 extending from a vicinity of groove bottoms of the first main grooves 14 toward the tread surface and inclined with respect to the tire circumferential direction. As the groove width of the first main grooves 14 formed by the first inclined walls 32 increases, that is, as the first inclined walls 32 advance toward the first land portion 12 or the inner sides of the second land portions 16, the minute groove groups 36 are inclined so as to extend toward the tread surface. The inclination angle θ (See FIG. 2) of the minute groove groups 36 with respect to the tire circumferential direction is preferably 10 to 80 degrees and, more preferably, 30 to 60 degrees. Each groove of the minute groove groups 36 has, for example, a depth of 0.2 to 0.5 mm and a groove width of 0.2 to 0.5 mm.

The reason for thus specifying the inclining direction of the minute groove groups 36 is to achieve an improvement in terms of on-snow performance. More specifically, as described below, any snow entering the first main grooves 14 can be efficiently discharged. That is, when certain portions in the tire periphery of the first main grooves 14 approach the vicinity of the tread surface, and snow enters the first main grooves 14, the snow having entered is compressed due to contraction of the grooves occurred through passage of the above-mentioned portions of the first main grooves 14 over the tread surface. At this time, the compressed snow moves to the right (direction in which the groove width is increased) along the first inclined walls 32 in FIG. 2. The movement, however, is hindered by convex portions of the second inclined walls 34, and the snow is compressed in the vicinity of the second inclined walls 34. At this time, as they run to the right (direction in which the groove width is increased) in FIG. 2, the minute groove groups 36 extend toward the tread surface, and hence the compressed snow is guided in the inclining direction of the minute groove groups 36 to move to the tread surface side. When, thereafter, the above-mentioned portions of the first main grooves 14 having compressed the snow have left the tread surface, the compressed snow has moved to the tread surface side, and hence it is easily discharged from the first main grooves 14.

Each of the second land portions 16 has a rib-like configuration extending continuously in the tire circumferential direction and is provided with arcuate curved grooves 38 and lug grooves 40 formed at fixed intervals extending from the second main grooves 18 toward the second land portions 16 in an arcuate or elliptical fashion. The lug grooves 40 are closed halfway through. The lug grooves 40 are inclined, for example, by 10 to 30 degrees with respect to the tire width direction. The groove length of the lug grooves 40 is 5 to 15 mm.

The arcuate curved grooves 38 are inclined by 5 to 45 degrees and, more preferably, 15 to 35 degrees, with respect to the tire width direction at openings leading to the second main grooves 18, and extend to the second land portions 16.

Each arcuate curved groove 38 is closed halfway through without joining any other arcuate curved grooves 38 adjacent thereto in the tire circumferential direction and without communicating with the first main grooves 14. As they extend from the openings leading to the second main grooves 18 toward the closed portions, the arcuate curved grooves 38 are gradually reduced in groove width and groove depth. It is desirable for the arcuate curved grooves 38 to be provided such that the direction of the arcuate curved configuration (direction of tangent) in the vicinity of the closed portions ranges from −20 to +20 degrees with respect to the tire circumferential direction.

Further, the arcuate curved grooves 38 extending from the second main groove 18 on one side with respect to the tire center CL extend in opposite direction from that of the arcuate curved grooves 38 extending from the second main groove 18 on the other side with respect thereto. That is, the arcuate curved grooves 38 on the right-hand side of the center line CL in FIG. 1A extend downwards from the second main groove 18, whereas the arcuate curved grooves 38 on the left-hand side of the center line CL extend upwardly from the second main groove 18.

As in the case of the lug grooves, the tread rigidity in the tire circumferential direction of the arcuate curved grooves 38 decreases in the vicinity of the openings leading to the second main grooves 18, and hence they function together with the lug grooves 40 to achieve an improvement in terms of traction performance on the snow.

On the other hand, in the vicinity of the closed portions, the arcuate curved grooves 38 are substantially in the tire circumferential direction, and hence their tread rigidity in the tire width direction decreases. Thus, it is possible to prevent sidewise slippage at the time of traction on the snow. On the other hand, each arcuate curved groove 38 does not communicate with the first main grooves 14, nor does it communicate with the other arcuate curved grooves 38 adjacent thereto, which means there is no pass-through portion, thereby achieving a reduction in tire noise.

Further, the second land portions 16 are provided with sipes 42, which are inclined in the tire circumferential direction with respect to the tire width direction from the closed portions of the lug grooves 40, and connected to the first main grooves 14 in a gentle arc. Further, the second land portions 16 are provided with another sipes 44, which extend from the first main grooves 14 in the same inclining direction as the sipes 42 but are closed halfway through.

In the second land portions 16, there exist no lug grooves extend across the same. Further, when they pass the tread surface, the sipes 42 and 44 are closed, and hence the second land portions 16 have a function similar to that of the rib-shaped land portions continuous in the tire circumferential direction. Thus, it is possible to achieve a reduction in tire noise.

The reason for providing the sipes 42 and 44 is to adjust, immediately before the certain portions on the tire periphery of the second land portions 16 having the sipes 42 and 44 come into contact with the ground (pass the tread surface) through rotation of the tire, the incident angle when certain portions of the second land portions 16 move obliquely with respect to the ground by the sipes 42 and 44, which extend across the second land portions 16 in the tire width direction.

The above-mentioned point heights 26 are provided at the ends of the second land portions 16 in contact with the first main groove 14, and hence the ends of the land portions are of a zigzag configuration. On the other hand, at the ends of the second land portions 16 in contact with the second main grooves 18, there are provided point heights 46 on the wall portions of the second main grooves 18, and hence those ends of the land portions are also of a zigzag configuration. Note that, at the step portions of a zigzag configuration due to the point heights 46, there are provided the arcuate curved grooves 38 and the lug grooves 40, and hence the steps at those portions are not to be visually recognized. However, by drawing imaginary lines, which are extensions of the groove walls of the second main grooves 18, in the portions that are not to be visually recognized, it is possible to confirm the presence of the zigzag-shaped steps.

The second main grooves 18 are provided such that the centers in the groove width direction of the second main grooves 18 are within a range of 20 to 40% of the tire tread width as measured from the tire center CL. The second main grooves 18 also correspond to the circumferential grooves of the present invention. The point heights 46 are provided on both side walls forming the second main grooves 18.

The point heights 46 are of the same configuration as the point heights 26, and hence a description thereof is omitted. Further, also on the walls of the point heights 46, there are provided minute groove wall groups similar to the minute groove groups 36 as illustrated in FIG. 2, making it possible to easily discharge the compressed snow.

Also in the point heights 46, three pairs of first and second adjacent inclined walls are provided in one tread pattern pitch determined between the adjacent lug grooves 40. In the present invention, the number of pairs is not restricted to three, and it is possible to provide the pairs up to five pairs.

Further, as extending in the direction in which the groove width of the second main grooves 18 formed by the first inclined walls increases, the minute groove groups provided on the first inclined walls of the point heights 46 are inclined so as to extend toward the tread surface. The inclination angle θ of the minute groove groups in the tire circumferential direction is preferably 10 to 80 degrees and, more preferably, 30 to 60 degrees.

The third land portions 20 are provided adjacent to the second main grooves 18, and correspond to shoulder regions of the tire. At the end of each third land portion 20 in contact with the second main groove 18, there are provided the above-mentioned point heights 46, and hence the end of the land portion 20 is of a zigzag configuration. At the step portions of a zigzag configuration, lug grooves 48 extend from the second main grooves 18. The lug grooves 48 are closed halfway through. The lug grooves 48 are positioned so as to extend the arcuate curved grooves 38 to the third land portions 20. In addition, they are inclined by 60 to 90 degrees with respect to the tire circumferential direction.

Also in the point heights 46 of the third land portions 20, three pairs of first and second adjacent inclined walls are provided in one tread pattern pitch determined by the adjacent lug grooves 48. In the present invention, the number of such pairs is not restricted to three, and it is possible to provide up to five pairs.

Further, also in the first inclined walls of the point heights 46, there are provided minute groove groups similar to the minute groove groups 36 so as to be inclined with respect to the tire circumferential direction. The minute groove groups are inclined so as to extend toward the tread surface as extending toward the direction in which the groove width of the second main grooves 18 formed by the first inclined walls increases. The inclination angle θ of the minute groove groups is 10 and 80 degrees and, more preferably, 30 to 60 degrees.

Further, the third land portions 20 are provided with lug grooves 50 and 56 extending toward the second main grooves 18 from the tire shoulder sides in gentle arcs from the tire tread ends so as to be closed halfway through. The lug grooves 50 are closed halfway through without being connected to the second main grooves 18. The lug grooves 48 correspond to the first lug grooves of the present invention, and the lug grooves 50 correspond to the second lug grooves of the present invention. One lug groove 50 is provided between every two lug grooves 48 adjacent to each other in the tire circumferential direction.

Further, the lug grooves 56, which are provided at positions in the tire circumferential direction substantially corresponding to the lug grooves 48, are closed halfway through without being connected thereto.

Sipes 54 are provided to extend from the closed portions of the lug grooves 50 so as to be connected to the second main grooves 18. On the other hand, there are provided sipes 54 extending from the closed portions of the lug grooves 54 to be connected to the lug grooves 48.

The reason for thus providing no lug grooves extending across the third land portions 20 is to achieve a reduction in tire noise. There exist no lug grooves extending across the third land portions 20. Further, the sipes 52 and 54 are closed when they pass the tread surface through rotation of the tire, and hence the third land portions 20 have a function similar to that of the rib-shaped land portions continuous in the tire circumferential direction, and do not reduce the tread rigidity in the tire circumferential direction of the third land portions 20.

On the other hand, the reason for providing the sipes 52 and 54 is to adjust by the sipes 52 and 54 the incident angle when the surfaces of certain portions of the third land portions 20 move obliquely with respect to the ground immediately before the above-mentioned portions of the third land portions 20 on the tire periphery of the third land portions 20 having the sipes 52 and 54 are brought into contact with the ground (pass the tread surface) through rotation of the tire.

Also in the third land portions 20, the lug grooves 48 are provided in the step portions of a zigzag configuration due to the point heights 46, and hence, although those portions are not to be visually recognized, by drawing imaginary lines, which are extensions of the groove walls of the second main grooves 18, it is possible to confirm the presence of the step portions of a zigzag configuration.

In the point sites 26 and 46 of the tread pattern 10, the first inclined walls of both side opposing walls forming the first main grooves 14 and the second main grooves 18 are inclined in the same direction with respect to the tire circumferential direction. Also regarding the second inclined walls, both side opposing walls forming the first main grooves 14 and 18 are inclined in the same direction with respect to the tire width direction. For example, as illustrated in FIG. 1B, the first inclined walls 32 on the first land portion 14 side and the first inclined walls 32 of the second land portions 16 are inclined to the left as seen in the drawing with respect to the tire circumferential direction, and the second inclined walls 34 on the first land portion 14 side and the second inclined walls 34 of the second land portions 16 are inclined upwardly as seen in the drawing with respect to the tire width direction.

The inclination angle of the first inclined walls 32 with respect to the tire circumferential direction is 5 to 20 degrees. However, it is more desirable for the angle to be 10 to 15 degrees. On the other hand, the inclination angle of the second inclined walls 34 with respect to the tire width direction is 0 to 45 degrees. However, it is more desirable for the angle to be 10 to 30 degrees.

The first inclined walls of main groove group (first circumferential groove group) of the first main grooves 14 and the second main grooves 18 situated on the right-hand side in the tire width direction of the tire center CL are all inclined in the same direction with respect to the tire circumferential direction, and the first inclined walls of the main groove group (second circumferential groove group) situated on the left-hand side of the tire width direction are also all inclined in the same direction with respect to the tire circumferential direction. Further, in this regard, it is desirable that the inclining direction of the first inclined walls of the main groove group (first circumferential groove group) situated on the right-hand side of the tire center CL with respect to the tire width direction be the same as the inclining direction of the first inclined walls of the main groove group (second circumferential groove group) situated on the left-hand side of the same.

Further, the second inclined walls of the first circumferential groove group are all inclined in the same direction with respect to the tire width direction, and the second inclined walls of the second circumferential groove group are also inclined in the same direction with respect to the tire width direction. Further, in this connection, the second inclined walls of the first circumferential groove group and the second inclined walls of the second circumferential groove group are inclined in the same direction.

In a tire having the above-mentioned tread pattern 10, the first main grooves 14 are provided within 15% of the tread width as measured from the tire center CL. This is due to the fact that, when the first main grooves 14 are provided on the outer sides of the positions corresponding to 15% of the tread width, the first land portion 12 is too large, resulting in deterioration in wetting performance, in particular, draining performance.

The second main grooves 18 are provided within 20 to 40% of the tread width as measured from the tire center CL. This is due to the fact that, when the second main grooves 18 are provided on the tire center CL side of the positions corresponding to 20% of the tread width of the second main grooves 18, the width of the second land portions 18 is reduced, whereby the tread rigidity of those portions is lowered, with the result that uneven wear easily occurs. Further, when the second main grooves 18 are provided on the sides opposite to the tire center CL with respect to the positions corresponding to 40% of the tread width, the third land portions 20 become smaller, whereby the rigidity of those portions is lowered, resulting in deterioration in controllability.

Further, the lug grooves provided in the first land portion 12, the second land portions 16, and the third land portions 20 are lug grooves closed halfway through. That is, there exist no lug grooves leading to the main grooves adjacent to the land portions. As a result, the pattern noise generated by the lug grooves is reduced, and the tire noise is markedly reduced.

It is desirable that a ratio with respect to the tread area of the groove area of see-through portions of the first main grooves 14 and the second main grooves 18, which are circumferential grooves to be 15 to 30%. When the tire circumferential grooves are cut along a section and seen, there are some portions that cannot be seen through due to the protrusions and recesses of the walls attributable to the zigzag configuration of the point heights. The term "see-through" portion refers to the portion excluding those portions that cannot be seen through, that is, the portion that can be seen through. In the example of FIG. 1B, the see-through portion is the portion indicated by symbol X.

The reason for setting the ratio of the groove area of the see-through portion to 15 to 30% is as follows. When this ratio is less than 15%, the hydroplaning performance during turning deteriorates, and when this ratio exceeds 30%, the tread rigidity of the tread pattern as a whole deteriorates, resulting in deterioration in controllability.

Further, as illustrated in FIG. 1B, minute groove groups are provided in the first inclined walls, whereby it is possible to achieve an improvement in on-snow performance without affecting the other performances.

Note that, while in the tire of this embodiment the point heights are provided in each of the circumferential grooves extending in the tire circumferential direction, it is also possible to adopt a tire in which the point heights are provided in one of the circumferential grooves. Note that it is desirable for the zigzag-shaped bent portions formed by the point heights to be provided 150 to 400 in number to at least one groove wall in the tire circumferential direction.

Figure 3:
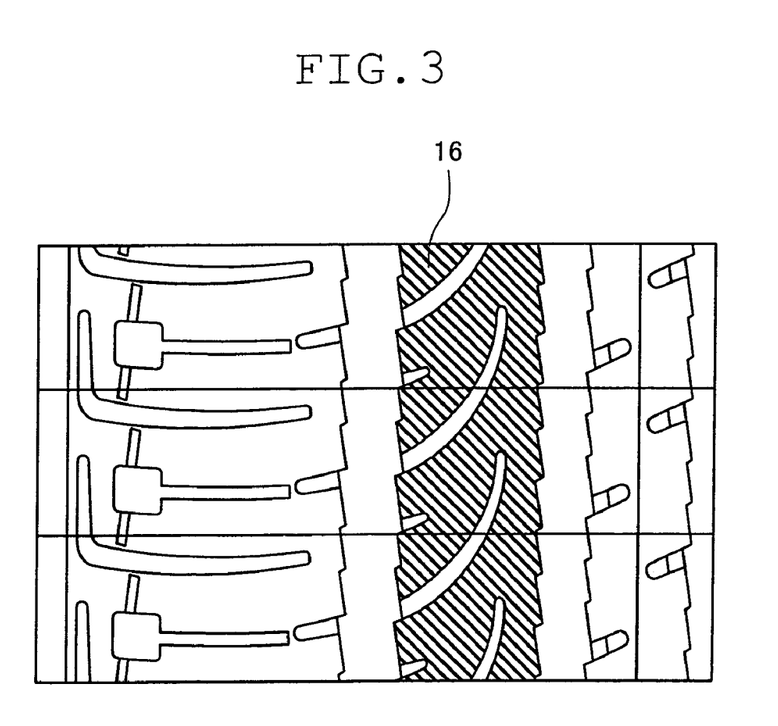
FIG. 3 is a diagram illustrating minute groove groups provided in the tread pattern of the tire according to the present invention.

Further, in the present invention, it is desirable that minute groove groups like the minute groove groups 36 as illustrated in FIG. 1B be provided on the tread surface of at least one land portion of the first land portion 12, the second land portions 16, and the third land portions 20 so as to be inclined with respect to the tire circumferential direction. By thus providing such minute groove groups in the tire surface of the land portions, it is possible to achieve an improvement in terms of on-snow performance at the initial stage of use of the tire. In particular, providing minute groove groups in the tread surface of the second land portions 16 as illustrated in FIG. 3 is desirable because it helps to secure the requisite controllability and achieve an improvement in terms of on-snow performance.

Further, in the present invention, apart from a tire in which four circumferential grooves are provided, it is also possible to adopt a tire in which three circumferential grooves are provided, or a tire in which more than four circumferential grooves are provided.

In the case of a tire in which three circumferential grooves are provided, a first circumferential groove is provided at the tire tread center CL, and one second circumferential groove is provided on either side in the tire width direction of this central circumferential groove. In this case, it is desirable for the second circumferential grooves to be provided so as to be within a range of 25 to 35% of the tire tread width as measured from the tire center CL.

EXAMPLES

In order to examine the effect of the tread pattern 10 of such a tire, some tires were prepared by way of experiment.

The tire size was 265/70R17 115H. The prepared tires had the following tread pattern, with their rims being 17×8J. The vehicle used to examine tire performance was an SUV vehicle with an engine displacement on the order of 6 liters. The inner pressure condition was 210 kPa for both the front and rear wheels.

Figure 4:
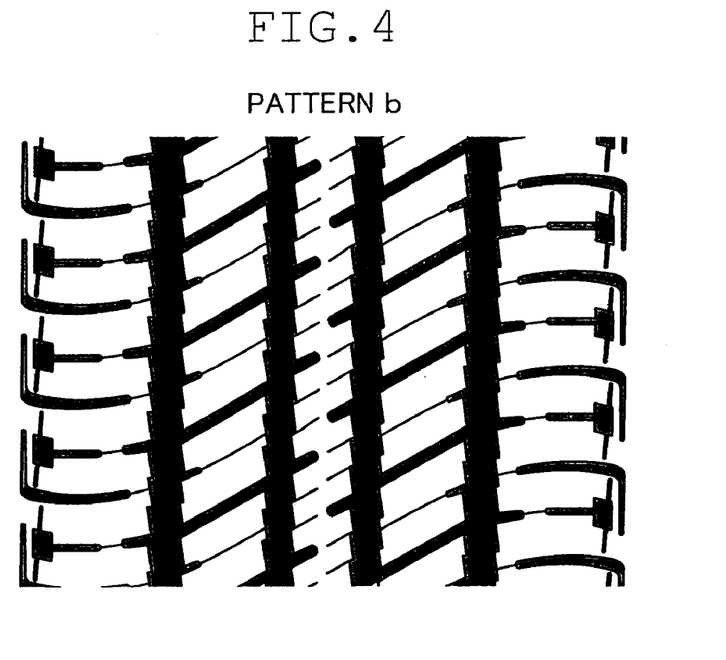
FIG. 4 is a diagram illustrating an example of the tread pattern adopted in the present invention.
Figure 5:
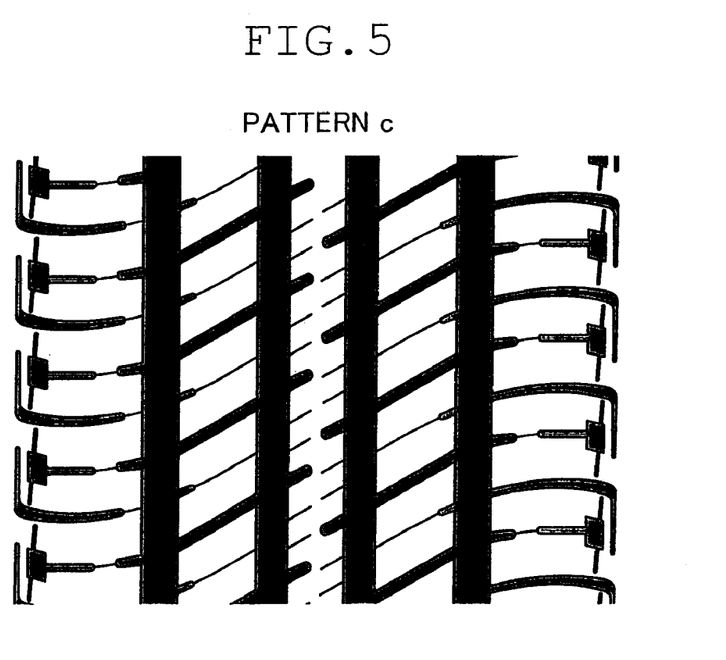
FIG. 5 is a diagram illustrating a tread pattern used as a comparative example with respect to the present invention.
Figure 6:
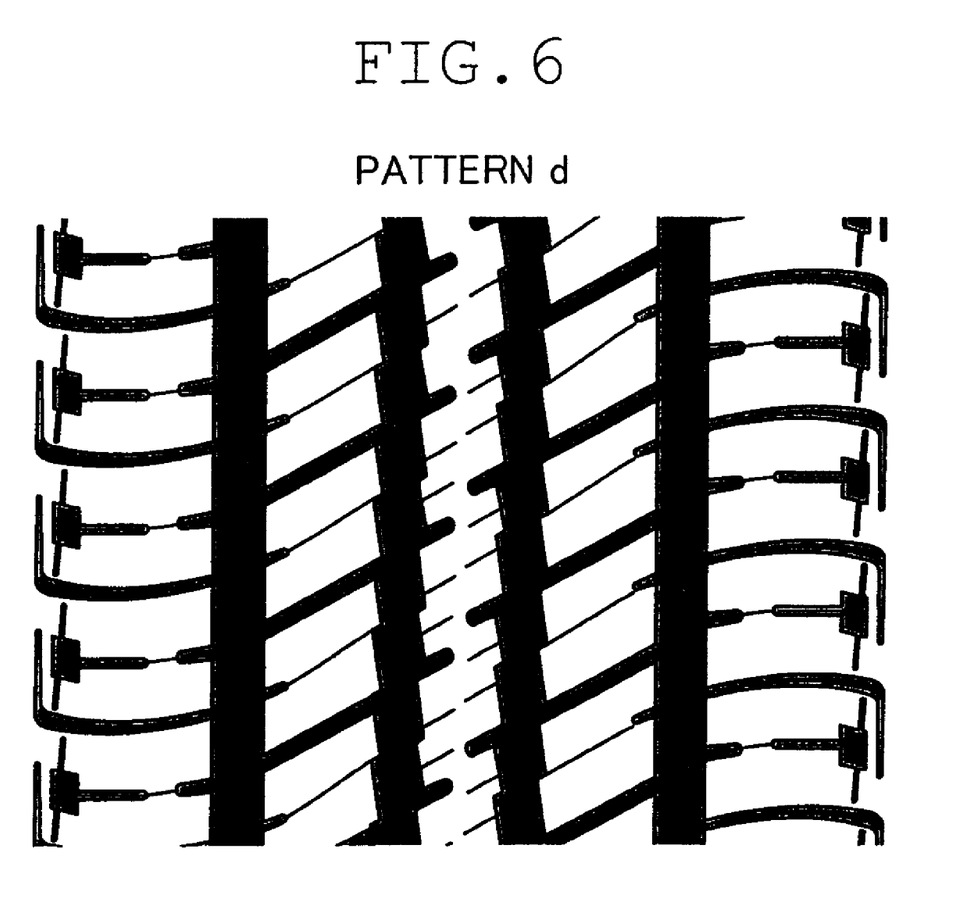
FIG. 6 is a diagram illustrating a tread pattern used as another comparative example with respect to the present invention.

As the tread patterns, the following patterns a through d were adopted. Pattern a is a pattern as illustrated in FIG. 1A, and patterns b through d are modifications based on the pattern a. Table 1 illustrates the specifications of patterns a through d. FIGS. 4 through 6 illustrate patterns b through d, respectively.

TABLE 1

| | First land portion | First main groove | Second land portion | Second main groove | Third land portion |
|---|---|---|---|---|---|
| Pattern a: FIG. 1A | With lag grooves 22 and sipes 24 | With point heights 26 | With lag grooves 40, arcuate curved grooves 38, and sipes 42 and 44 | With point heights 46 | With lag grooves 48, 50, and 56 and sipes 52 and 54 |
| Pattern b: FIG. 4 | With lag grooves 22 and sipes 24 | With point heights 26 | With lag grooves leading to first and second main grooves, and sipes | With point heights 46 | With lag grooves 48, 50, and 56 and sipes 52 and 54 |
| Pattern c: FIG. 5 | With lag grooves 22 and sipes 24 | No point heights 26 | With lag grooves 40, sipes 42, lag grooves leading to first and second main grooves; no arcuate curved grooves 38 | No point heights 46 | With lag grooves (5 mm wide) leading to second main grooves, and sipes 54 |
| Pattern d: FIG. 6 | With lag grooves 22 and sipes 24 | With point heights; two bent portions per pitch | With lag grooves 40, sipes 42, lag grooves leading to first and second main grooves; no arcuate curved grooves 38 | No point heights 46 | With lag grooves (5 mm wide) leading to second main grooves, and sipes 54 |

The dimensions of the various portions of the pattern a are as follows.

The position/tread-width of the first main grooves 14 as measured from the tire center CL: 10%

The groove width and the groove depth of the first main grooves 14: 10.0 mm, 10.0 mm The position/tread-width of the second main grooves 18 as measured from the tire center CL: 33%

The groove width and the groove depth of the second main grooves 18: 12.0 mm, 10.0 mm The groove width, the groove length, and the inclination angle with respect to the tire width direction of the lug grooves 22: 4.5 mm, 13.0 mm, 20 degrees The length of the sipes 24: 12.0 mm The groove width, the groove length, and the inclination angle with respect to the tire width direction of the lug grooves 40: 3.0 mm, 7.0 mm, 25 degrees The length of the sipes 44: 13.5 mm The groove width of the arcuate curved grooves 38 where they join the second main grooves 18, the length along the arc of the arcuate curved grooves 38, and the inclination angle thereof with respect to the tire width direction: 4.0 mm, 49 mm, 28 degrees The groove width, the groove length, and the inclination angle with respect to the tire width direction of the lug grooves 48: 3.8 mm, 10.0 mm, 9 degrees The groove width of the lug grooves 50: 3.5 mm The groove width of the lug grooves 56, and the groove length to the tread ends thereof: 3.1 mm, 11.0 mm The length of the first inclined walls 32 and the inclination angle thereof with respect to the tire circumferential direction: 10.0 mm, 10 degrees The length of the second inclined walls 34 and the inclination angle thereof with respect to the tire width direction: 2.0 mm, 25 degrees The point heights provided on the walls of the first main grooves of the pattern d have two bent portions per pitch, which means the requirement that there should be provided three to five pairs of first and second inclined walls in one pitch as restricted in the present invention, that is, the requirement that there should be provided three to five bent portions, is not satisfied.

As can be seen from the above, the tires with the patterns a or b are ones according to the present invention (examples), and the tires with the patterns c or d are not ones according to the present invention (comparative examples).

The tire test was conducted for on-snow performance and tire noise.

Regarding the on-snow performance, each tire was evaluated by measuring a requisite braking distance for stopping the vehicle when braking was effected when the vehicle was traveling at a traveling speed of 40 km/h on a snow-covered road in an outdoor testing site. In view of variation in traveling speed, correction was effected on the values of five braking distances. Of those values, those of the maximum braking distance and of the minimum braking distance were excluded, and the average value of the remaining three braking distances was obtained.

Regarding the tire noise performance, deceleration was effected in a natural manner from a traveling speed of 80 km/h on a dry road surface in the tire testing site, and the magnitude of the sound pressure of in-vehicle pattern noise was evaluated through sensory evaluation made by the driver.

Table 2 illustrates the test results. Each result is indicated by an index. The larger the index, the more satisfactory the on-snow performance and the tire noise performance.

TABLE 2

|  | On-snow performance | Tire noise performance |
| --- | --- | --- |
| Pattern a | 108 | 120 |
| Pattern b | 110 | 115 |
| Pattern c | 95 | 100 |
| Pattern d | 100 | 100 |

As compared with the tires of the patterns c and d provided with no point heights 26, 46, the tires of the patterns a and b provided with the point heights 26, 46 are improved in terms of the on-snow performance and the tire noise performance, which indicates compatibility between the on-snow performance and the tire noise performance.

The tread pattern 10 of the tire according to the above-mentioned embodiment has the first land portion 12 provided on the tire center CL, the first main grooves 14 provided adjacent to both sides of the first land portion 12 within a range of 15% of the tire tread width as measured from the tire center CL, the second land portions 16 provided adjacent to outer sides of the first main grooves 14, and the second main grooves 18 provided adjacent to the outer sides of the second land portions 16 within a range of 20 to 40% of the tire tread width as measured from the tire center CL. However, it is not limited to the above structure. For example, the tread pattern 10 of the tire may include a first circumferential groove provided at a tire tread center position, that is, on the tire center CL, and second circumferential grooves provided each on either side in the tire width direction of the first circumferential groove within a range of 15 to 45% of a tire tread width as measured from the tire center CL.

In the pneumatic tire of the present invention, the groove walls of the circumferential grooves are formed by the first inclined walls and the second inclined walls, and point heights bent in a V-shape are provided at the connection portions between the first inclined walls and the second inclined walls, with three to five point height bent portions being provided per one tread pattern pitch, whereby it is possible to attain compatibility between a reduction in tire noise and an improvement in on-snow performance.

The present invention is not restricted to the pneumatic tire of the embodiment described in detail above, and various improvements and modifications are naturally possible without departing from the gist of the present invention.

What is claimed is:

1. A pneumatic tire having a tread pattern which comprises at least three circumferential grooves extending in a tire circumferential direction and at least three land portions having rib-like configurations extending continuously in the tire circumferential direction,
    wherein, on groove walls on both sides forming the at least three circumferential grooves, first inclined walls inclined by an inclination angle of 5 to 20 degrees with respect to the tire circumferential direction and second inclined walls inclined by an inclination angle of 0 to 45 degrees with respect to a tire width direction are provided so as to be successively connected in the tire circumferential direction so that positions of groove ends in the tire width direction vary in the tire circumferential direction,
    connecting portions between the first inclined walls and the second inclined walls being bent in a V-shape in a plan view of the tread pattern,
    a length of the first inclined walls being larger than a length of the second inclined walls, every two of the first inclined walls on both sides of each of the second inclined wall having a step amount of 1.5 to 5.0 mm in the tire width direction, three to five pairs of the first inclined walls and the second inclined walls adjacent to each other being provided in each circumferential groove for one tread pattern pitch, the at least three land portions including a first land portion through which a tire center position passes and which extends in the tire circumferential direction, second land portions provided both sides of the first land portion extending in the tire circumferential direction, and third land portions provided on outer sides in the tire width direction of the second land portions and extending in the tire circumferential direction, the at least three circumferential grooves including first main grooves provided between the first land portion and the second land portions, and second main grooves provided adjacent to outer sides in the tire width direction of the second land portions, the first main grooves being provided within a range of 15% of the tire tread width as measured from the tire center position, the second main grooves being provided within a range of 20 to 40% of the tire tread width as measured from the tire center position, the first land portion, the second land portions, and the third land portions, being provided so as to extend continuously in the tire circumferential direction, while free from being provided with lug grooves extending entirely thereacross, the third land portions including, in the tire circumferential direction, a plurality of first lug grooves extending from the second main grooves toward tire shoulder sides and closed halfway through, and a plurality of second lug grooves extending from the tire shoulder sides toward the second main grooves and closed halfway through, with one second lug groove being provided between every two adjacent first lug grooves.

2. The pneumatic tire according to claim 1, wherein, the first inclined walls of opposing walls on both sides of each of the at least three circumferential grooves are inclined in the same direction with respect to the tire circumferential direction.

3. The pneumatic tire according to claim 1,
wherein the second land portions are provided with arcuate curved grooves extending from the second main grooves, the arcuate curved grooves being closed without communicating with the first main grooves, the arcuate curved grooves in the second land portion on one side of the tire center position extending in opposite direction from that of the arcuate curved grooves in the second land portion on another side of the tire center position.

4. The pneumatic tire according to claim 1, wherein a ratio of a groove area of see-through portions of the first main grooves and the second main grooves with respect to a tread area is 15 to 30%.

5. The pneumatic tire according to claim 1, wherein a plurality of minute groove groups inclined with respect to the tire circumferential direction are provided on a tread surface of at least one of the first land portion, the second land portions, and the third land portions.

6. The pneumatic tire according to claim 1 wherein the tread pattern is free from being provided with lug grooves extending entirely across any one of the land portions to connect the circumferential grooves provided on both sides of the one of the land portions.

7. The pneumatic tire according to claim 1 wherein the tread pattern is provided with lug grooves formed in one of the land portions, the lug grooves extending from one of the circumferential grooves provided on both sides of the one of the land portions toward the other of the circumferential grooves in the tire width direction and closed halfway through.

* * * * *